US010900276B2

(12) United States Patent
Bauer et al.

(10) Patent No.: US 10,900,276 B2
(45) Date of Patent: Jan. 26, 2021

(54) ASSEMBLY PRESS AND METHOD FOR PRODUCING INSULATING GLASS ELEMENTS

(71) Applicant: LISEC Austria GmbH, Seitenstetten (AT)

(72) Inventors: Michael Bauer, St. Peter in der Au (AT); Christian Schreiner, Behamberg (AT); Andreas Reickersdorfer, Seitenstetten (AT)

(73) Assignee: LISEC Austria GmbH, Seitenstetten (AT)

( * ) Notice: Subject to any disclaimer, the term of this patent is extended or adjusted under 35 U.S.C. 154(b) by 444 days.

(21) Appl. No.: 15/794,254

(22) Filed: Oct. 26, 2017

(65) Prior Publication Data
US 2018/0044972 A1 Feb. 15, 2018

Related U.S. Application Data

(63) Continuation of application No. PCT/EP2016/059784, filed on May 2, 2016.

(30) Foreign Application Priority Data

Apr. 30, 2015 (DE) .......................... 10 2015 005 612

(51) Int. Cl.
*E06B 3/673* (2006.01)
*E06B 3/66* (2006.01)
(Continued)

(52) U.S. Cl.
CPC ........ *E06B 3/67386* (2013.01); *B65G 49/061* (2013.01); *E06B 3/6617* (2013.01);
(Continued)

(58) Field of Classification Search
CPC .............. E06B 3/67386; E06B 3/6775; E06B 3/67326; E06B 3/6617; E06B 3/67365; B65G 49/061
See application file for complete search history.

(56) References Cited

U.S. PATENT DOCUMENTS 6,553,653 B2 * 4/2003 Hulings ................ B23P 21/004
269/239
6,609,611 B1 * 8/2003 Lenhardt .............. B65G 49/063
198/626.1

FOREIGN PATENT DOCUMENTS

DE  19909638 A1  9/2000
JP  08040755 A * 2/1996 ........... E06B 3/6775
(Continued)

OTHER PUBLICATIONS

JP08040755 translation, Peter Lisec, Device for producing insulating glass pane filled with heavy gas, Feb. 13, 1996 (Year: 1996).*
(Continued)

*Primary Examiner* — Queenie S Dehghan
(74) *Attorney, Agent, or Firm* — Edell, Shapiro & Finnan, LLC.

(57) ABSTRACT

An assembly press for producing an insulating glass element with two panes includes: two press elements arranged opposite each other with a working chamber defined by a spacing therebetween, the spacing being adjustable in a first direction to press together the panes; and a conveying device to transport the panes into and out of the working chamber in a second direction perpendicular to the first direction, at least one of the press elements being adjustable in a third direction perpendicular to the first and second directions. The conveying device comprises first and second drivable conveying elements respectively including first and second support mechanisms to respectively support lower faces of the two panes during transport in a first and second transport
(Continued)

planes. The first and second conveying elements are adjustable independently of each other such that the transport planes are located at different positions in the third direction.

13 Claims, 4 Drawing Sheets

(51) Int. Cl.
*B65G 49/06* (2006.01)
*E06B 3/677* (2006.01)
(52) U.S. Cl.
CPC ........ *E06B 3/6775* (2013.01); *E06B 3/67326* (2013.01); *E06B 3/67365* (2013.01)

(56) References Cited

FOREIGN PATENT DOCUMENTS

| WO | 03014511 A1 | 2/2003 |
| WO | 2013114302 A1 | 8/2013 |

OTHER PUBLICATIONS

International Search Report in corresponding PCT Application No. PCT/EP2016/059784, dated Jul. 22, 2016, with English translation.

* cited by examiner

ASSEMBLY PRESS AND METHOD FOR PRODUCING INSULATING GLASS ELEMENTS

CROSS REFERENCE TO RELATED APPLICATIONS

This application is a continuation of International Application No. PCT/EP2016/059784, filed on May 2, 2016, which claims priority under 35 U.S.C. § 119 to Application No. DE 102015005612 filed on Apr. 30, 2015, the entire contents of which are hereby incorporated by reference.

TECHNICAL FIELD

The invention relates to an assembly press and a method for producing insulating glass elements with at least two parallel panes, which are connected together by a spacer arranged between adjacent panes.

BACKGROUND

Insulating glass elements are typically produced by mounting a spacer frame or a spacer profile in a frame-like manner on one surface of a glass pane in a first step and then in a further step mating this unit with another glass pane under pressure; and then the insulating glass element that is formed in this way is provided with a sealant around the entire periphery. Optionally the space between the panes is evacuated and/or is filled with a fill gas or protective gas before the unit is connected to the second glass pane.

In principle, insulating glass elements of this type can be formed with n glass panes and n−1 spacers, where n>1. The glass panes that are to be mated in this way are not necessarily congruent, so that not all pane edges of an insulating glass element are in alignment with each other. In this case one speaks of so-called "step elements," wherein an insulating glass element composed of more than two panes may also have a plurality of such steps in the edge region.

An assembly press for producing such insulating glass elements, and, in so doing, also the step elements, and a method, based on the application of the assembly press, are known from the publication EP 2093370A2. The assembly press comprises, as shown in FIG. 1 (which shows a perspective view of the whole assembly press) and FIG. 2 (which shows an enlarged detail view of the area with the conveying device from FIG. 1), two press elements 4', 5', which are arranged opposite each other. One (4') of these press elements is stationary, and the other (5') can be moved relative thereto in the Z direction as well as vertically perpendicular to the Z direction and the transport direction X, which will be described below. Between the press elements 4', 5' there is defined a working chamber, in which the glass panes to be connected to the insulating glass element are placed with spacers along the transport direction X. For this transport there is a conveying device, associated with the stationary press element 4', in the form of a transport band 7' on the lower face of the working chamber. The conveying device's conveying element (the conveyor band with corresponding drive rollers) is adjustable in the Y direction perpendicular to the Z and X directions (i.e., in the vertical direction).

The machine coordinate system, which is defined by the Z, X axes and the Y axis perpendicular thereto, may be inclined in total at an angle of up to 6° relative to the horizontal.

The assembly of an insulating glass element composed of two or more panes with spacers is carried out with this device as follows:

First, a first glass pane, which is conveyed by a transport device to the assembly press, is transported into the working chamber in a vertical orientation (or in the case of a machine coordinate system, which is tilted in accordance with the above description, in an orientation that is slightly inclined in relation to the vertical) by the band conveying device 7' and is placed against the stationary press element 4'. Then the second movable press element 5' is moved by suitable drive elements against the stationary press element 4' until the glass pane rests against the movable press element. In this position the glass pane is fixed by suction devices of the movable press element thereto and, in addition, is placed on a deposit strip of the press element; and it is then moved together with the movable press element 5' away from the stationary press element 4'. Subsequently the second glass pane is transported with the spacer frame, which had been previously mounted on the second glass pane, into the resulting opened working chamber such that the second glass plane is also conveyed by a transport mechanism in a vertical orientation. As before, the first glass pane is transported by the band conveying device 7' into the working chamber and placed against the press element 4'.

In the next step the working chamber is sealed off from the environment and is filled with a fill gas from the lower face in the area of the band conveying device 7'. Subsequently the movable press element 5' is moved with the first glass pane, which is held securely at the press element, against the second glass pane, which is held securely at the stationary press element 4' and is pressed together with the second glass pane, in order to form the insulating glass element.

This process may be repeated, if required, with insulating glass elements having more than two glass panes by opening the working chamber again and by conveying another glass pane with a mounted spacer frame into the working chamber and then pressing together in a suitable manner with the previously formed unit, which was fixed by the suction device and the deposit strip to the movable press element 5' and was held by the latter.

Step elements are produced such that the movable press element 5', together with the respective glass pane, which is held securely by the suction device glass pane at the press element, is moved the required distance in the Y direction perpendicular to the Z and X directions, before the glass panes are pressed together. Optionally, the vertical position of the bottom edge of the glass pane, which is securely held at the stationary press element 4', is also changed by lowering the band conveying device 7', in order to produce step elements.

Since only the glass pane, associated with the stationary press element 4', is supported on the transport device after the glass panes have been connected, and the glass pane, associated with the movable press element 5', at least when transported away, when the deposit strip has been brought necessarily out of contact with the bottom edge of the glass pane, this glass pane loses the support on the lower face (bottom edge), which may result in this glass pane slipping or becoming detached from the previously formed element, falling off and breaking, an aspect that necessitates costly cleanup work. In the case of elements that are formed by more than two panes of glass, not only an outer glass pane, but also other glass panes located between the outer glass panes of a multi-part insulating glass element lose the support.

Even if such a known assembly press was used to correctly mate the insulating glass element, there is the problem that, in particular, with thermoplastic extruded spacers or spacers made of thermoplastic material or of at least partially elastic materials, such as metal or plastic, the lack of support for the panes on the lower face after the mating of the panes may result in the shear forces causing the glass panes to shift slightly relative to each other due to elastic deformation and/or creep, as long as the edge seal of the insulating glass element has not sufficiently solidified yet. While in the case of insulating glass elements with congruent glass panes an additional repositioning of the element on the conveying device so that both glass panes are on the same conveying device may minimize the problem somewhat, this measure is not available for step elements.

WO 2013/114302A1 discloses another assembly press and a method for producing insulating glass elements with three glass panes, where in this case the assembly press comprises two press elements, which are adjustable only at a distance from each other, i.e., in the pressing direction. The assembly press has a band conveying device, which, on the whole, is adjustable in the pressing direction of the press elements. The band conveying device is divided in the horizontal or, more specifically, the transverse direction into three separate circulating bands, which in the horizontal direction are arranged at a constant distance from each other and of which one is fixed in the vertical direction and two narrower, adjacent bands can be lifted, independently of each other, in the vertical direction, in order to move the glass panes, which had been moved one after the other into the working chamber between the press elements which are part of a step element, vertically upwards with respect to a transport plane of the band conveying device, where the glass panes are received and held securely by suction devices at the press elements, provided the glass panes are the two outer glass panes of the insulating glass element. However, even in the case of this assembly press the narrow conveyor bands are lowered again by the press elements after transport into the working chamber and the takeover of the vertically raised glass panes, so that the respectively vertically raised glass panes are held by just the suction devices at the press elements. Although the third glass pane, arranged between the two outer glass panes, is supported on the lower face by the middle band of the conveyor bands during the pressing process and is lifted to the raised level of the two outer glass panes, the entire insulating glass element is lowered again to the level of the transport plane by lowering of the middle conveyor band after the pressing operation. Therefore, in this case, too, there is also the above-described risk that the position of individual glass panes of an insulating glass element (in this case the two outer glass panes) will shift during the assembly or after the assembly when lowering to the level of the transport plane due to gravity and the lack of support at the lower face, in particular, in the case of large and heavy panes of glass.

SUMMARY

An object of the present invention is to provide an assembly press and a method for producing insulating glass elements with at least two parallel panes, which are connected together by at least one spacer, arranged between adjacent panes, and to improve the assembly press and method such that the production of insulating glass elements, in particular, step elements, can be carried out in a reliable and dimensionally stable way even at high weights.

In order to solve this problem, the present invention proposes an assembly press and a method for producing insulating glass elements.

Based on the aforesaid, the invention relates, in particular, to an assembly press for producing insulating glass elements with at least two parallel panes, which are connected together by at least one spacer, which is arranged between adjacent panes, the assembly press comprising two press elements, which are arranged opposite each other and which define a working chamber between each other, wherein the spacing between them is adjustable in a first direction (Z), in order to press together the panes, located in the working chamber, to form the insulating glass element; and comprising a conveying device for transporting the panes into the working chamber to a working position and out of the working chamber in a second direction (X), which is perpendicular to the first direction (Z); wherein at least one of the press elements is adjustable in a third direction (Y), which is perpendicular to the first direction (Z) and the second direction (X); wherein the conveying device has at least two drivable conveying elements, each having a support mechanism for supporting the lower face of at least one of the at least two panes during transport of the same in a respective transport plane and which are adjustable independently of each other, so that the transport planes, defined by the support mechanism, are located at different positions in the third direction (Y), which is perpendicular to the first direction (Z) and the second direction (X).

The invention also relates to a method for producing insulating glass elements with at least two parallel panes, which are connected together by at least one spacer arranged between adjacent panes, the method comprising the steps of: transporting the panes to a working position in a working chamber, which is defined between two press elements, which are arranged opposite each other, wherein the spacing between the press elements is adjustable in a first direction (Z), in a second direction (X), which is perpendicular to the first direction (Z), wherein the lower faces of the panes are supported in each case by a support mechanism by conveying elements of a conveying device during transport; adjusting the transport planes, defined by the support mechanism of the conveying elements, relative to each other, by adjusting at least one of the support mechanisms in a third direction (Y), which is perpendicular to the first direction (Z) and the second direction (X); adjusting the distance between the press elements in the first direction (Z), in order to press together the panes, located in the working chamber, in order to form the insulating glass element; and transporting the insulating glass element out of the working chamber in the second direction (X), wherein the lower faces of the panes are supported by a respective support mechanism of the conveying elements during transport.

Since in both the inventive assembly press as well as in accordance with the method all of the glass panes of an insulating glass element with two glass panes, in particular, a step element, are always supported at the lower face or, more specifically, the bottom edge by the support mechanism, associated with the respective glass pane, of the conveying element of the conveying device not only during transport into and out of the working chamber, but also in the phases with the exception of a short phase, in which the glass panes are held by the press elements, which are pressed together, it is possible to prevent the glass panes from shifting due to the gravitational forces during assembly and also thereafter, as long as the connection has not yet solidified, in a reliably way, even if the weight of the glass panes is high.

In addition, the allocation of a dedicated conveying element of the conveying device to each of the glass panes in the assembly press offers the option of shortening the cycle time for producing an insulating glass element, in particular, in comparison to an assembly press of the type described in the introduction, where individual glass panes are placed on the support devices of the press elements and are lifted off again after pressing, in order to remove the support devices in order to transport away.

The method of the invention or the assembly press of the invention can be particularly advantageous to use in conjunction with step elements that are formed by more than two glass panes. In the case of such step elements that are formed, for example, by two small glass panes and one large glass pane, the assembly press according to the method known from the prior art has to have a device for lifting the assembled half element composed of the two small panes and the spacer, located in-between, so that during handling of the half element there is the risk that the effect of gravity will cause the glass panes to shift relative to each other, while the half element is manipulated in the assembly press.

Preferably the support mechanism is formed by an array of rolls or rollers or a transport band or a transport belt or a combination thereof. In this case special preference is given to a transport band or a transport belt, because the large-area, continuous and usually elastic supporting surface at the lower faces of the glass panes protects the glass panes from being damaged.

Preferably one of the conveying elements or both conveying elements are also adjustable, independently of each other and independently of the press elements, in the first direction (Z), i.e., transversely to the transport direction (X). This aspect allows the assembly press to be adjusted to various wide glass panes and insulating glass elements or to insulating glass elements having more than two glass panes. The adjustability in the first direction (Z) is also required for transferring the panes and for repositioning.

Preferably at least one of the two conveying elements is coupled or is selectively couplable to the respective adjacent press element, in order to be adjustable together with the latter in the first direction (Z) and/or in the third direction (Y). Thus, according to the method, one conveying element or both conveying elements can be adjusted in each case together with an adjacent or associated press element in the first direction (Z) and/or in the third direction (Y).

A coupling in this context means that the respective conveying element is mechanically connected or can be connected, if necessary, to the press element such that the conveying element moves with the press element in the Y direction and with the press element in the Z direction, but continues to ensure the movability of the conveying element relative to the press element. At the same time the force of the weight acting on the conveying element is supported by the press element. One advantage of this variant is the greater ease of control and greater mechanical accuracy.

By coupling the conveying elements to the respectively associated press element for the pressing operation and the common movement, it is possible to prevent a slip between the lower faces of the glass panes and the supporting surface of the support mechanism of the conveying elements and to prevent the glass panes from being damaged and to simplify the mechanical drive, because no complicated synchronization of the respective drive of the press element and the associated conveying element is required.

In an alternative design at least one of the conveying elements (or all of the conveying elements of the assembly press) can be driven, independently of, but synchronously with an adjacent, associated press element, in order to be adjustable together with the latter in the first direction (Z) and/or in the third direction (Y). In this variant the force of the weight acting on the conveying element is not supported by the press element, but rather directly by the machine base. Preferably the conveying elements of the conveying device can be driven synchronously with each other by a corresponding function of the control device, preferably while the transport planes, defined by their respective support mechanisms, are located at different positions in the third direction (Y). With this embodiment it is achieved that an assembled step element can be carried away from the working chamber of the assembly press, while all of the glass panes of the element are supported simultaneously at the lower face; and, as a result, a relative displacement of the glass panes is avoided when the edge seal has not completely hardened yet. The synchronization of the drives ensures that there is no slip between the support mechanism of the associated conveying element and the lower face of a glass pane.

Preferably in the method of the invention the panes are transported one after the other to the working position in the working chamber; and a pane, which had been transported into the working chamber first, is placed or rather repositioned by the support mechanism of one of the conveying elements of the conveying device on the support mechanism of another of the conveying elements, in that the pane, which had been transported first into the working chamber, is held temporarily by one of the press elements, while the other of the conveying elements is moved in the third direction Y and in the first direction Z under the glass pane.

Preferably in the method of the invention all of the panes of the insulating glass element to be produced are always supported at the lower face by the support mechanism of one of the conveying elements and/or are held by the pressing force of the press elements while transporting into the working chamber, while pressing the glass panes to form the insulating glass element in the working chamber, and while transporting the insulating glass element out of the working chamber. This arrangement ensures that a relative displacement of the glass panes due to the gravity does not occur. In principle, the support of the lower face of the glass panes by the conveying elements is interrupted only for a short period of time during the production process of the insulating glass element, i.e., when the respective glass panes are in the process of being subjected to the pressing pressure of the press elements, and a displacement due to these relatively high pressure forces does not occur. In this phase one or both of the conveying elements are then repositioned to another position under the lower face of the glass panes by moving in the Y direction and in the Z direction, and in this other position the conveying elements support again the glass panes after the press elements have been opened.

Preferably it is possible to actuate the drive elements for causing the adjustment of the transport plane of the support mechanism of the conveying elements in the third direction (Y) and/or for adjusting in the first direction (Z) based on the evaluation of the output of one or more sensors, which are arranged at a position in the transport direction in front of the working chamber for purposes of scanning the panes, in order to form the insulating glass element, and/or a data carrier associated therewith. As a result, the assembly press can be automatically adjusted and configured to each insulating glass element that is to be machined.

The orthogonal machine coordinate system XYZ, which is defined by the axes Z (first direction or infeed of the press elements when pressing together the glass panes), X (second direction or transport direction of the individual glass panes into the working chamber and the transport direction of the insulating glass element out of the working chamber) and Y (third direction or the direction perpendicular to the first and second directions Z and X respectively), can be inclined altogether, as in the prior art, by up to 10°, preferably by up to 6° with respect to the horizontal, i.e., while maintaining the orthogonality of the axes to each other, together with the conveying device, the support mechanism and the transport planes, defined by the latter, and the press elements, by being tilted about the horizontal X axis, so that the glass panes, which are arranged at the stationary press element, are mounted so as to be inclined and do not tip into the working chamber. In this case the glass pane may be fixed by gravity to the stationary press element and, optionally also without any additional holding devices, for example, the suction devices provided in the prior art. However, additional holding device may be provided, if desired.

The transport of the glass panes into the working chamber and the transport of the insulating glass element out of the working chamber in the second direction (X) can be carried out in the same direction or in opposite directions in each case by the conveying device.

Preferably the assembly press is provided with a device for introducing a fill gas, such as, for example, argon, krypton or xenon, into the working chamber and/or a device for evacuating the working chamber. Thus, the method provides that a fill gas is introduced into the working chamber or the working chamber is evacuated before and/or during the adjustment of the distance between the press elements in the first direction (Z), in order to press together the panes, located in the working chamber, to form the insulating glass element. It is also conceivable to evacuate the working chamber initially at least partially and then to introduce the fill gas. This functional enhancement can be used to fill the space between the panes of the insulating glass element with the fill gas or to evacuate the space between the panes of the insulating glass element, as long as the two glass panes are not yet pressed together or not yet fully pressed together. Filling the working chamber with the fill gas during the horizontal movement can contribute to a further reduction in the cycle time.

BRIEF DESCRIPTION OF THE DRAWINGS

The invention is explained below once again with reference to the accompanying drawings. The drawings show in.

DETAILED DESCRIPTION

Figure 1:
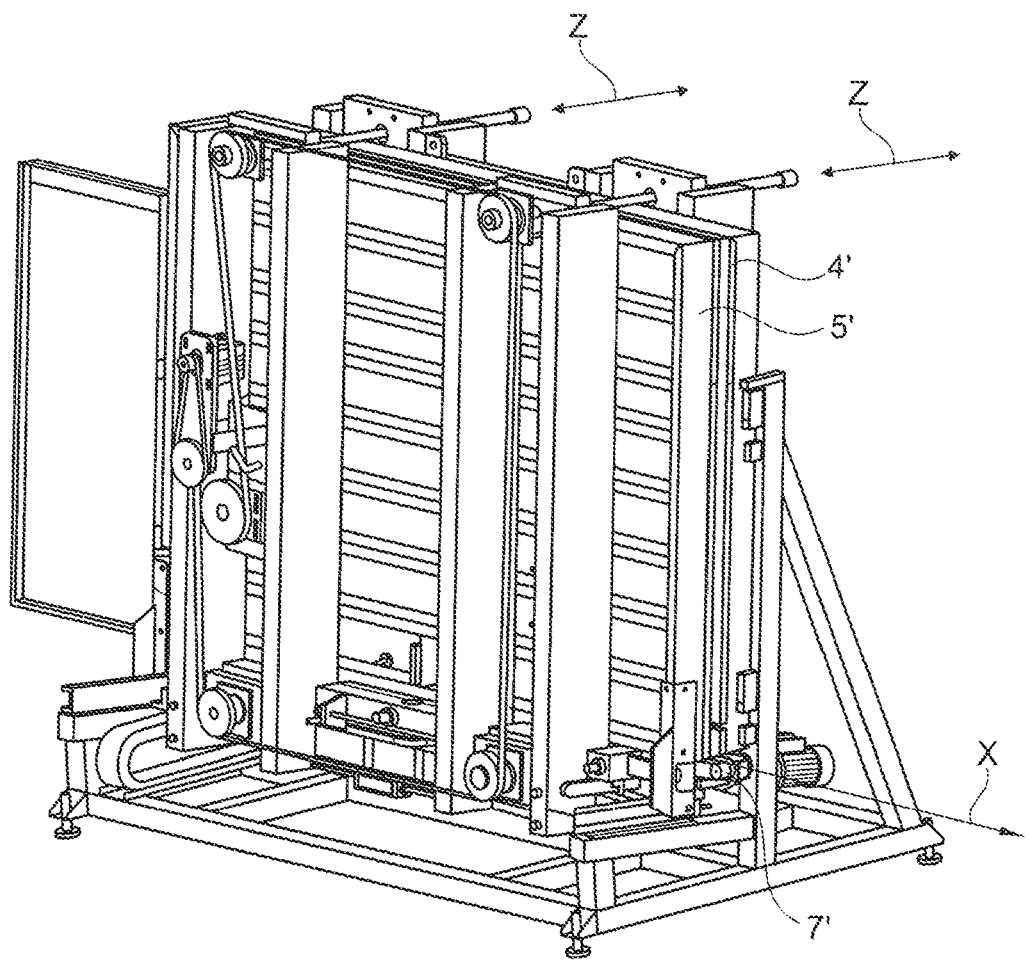
FIG. 1 a perspective view of an entire assembly press according to the prior art.
Figure 2:
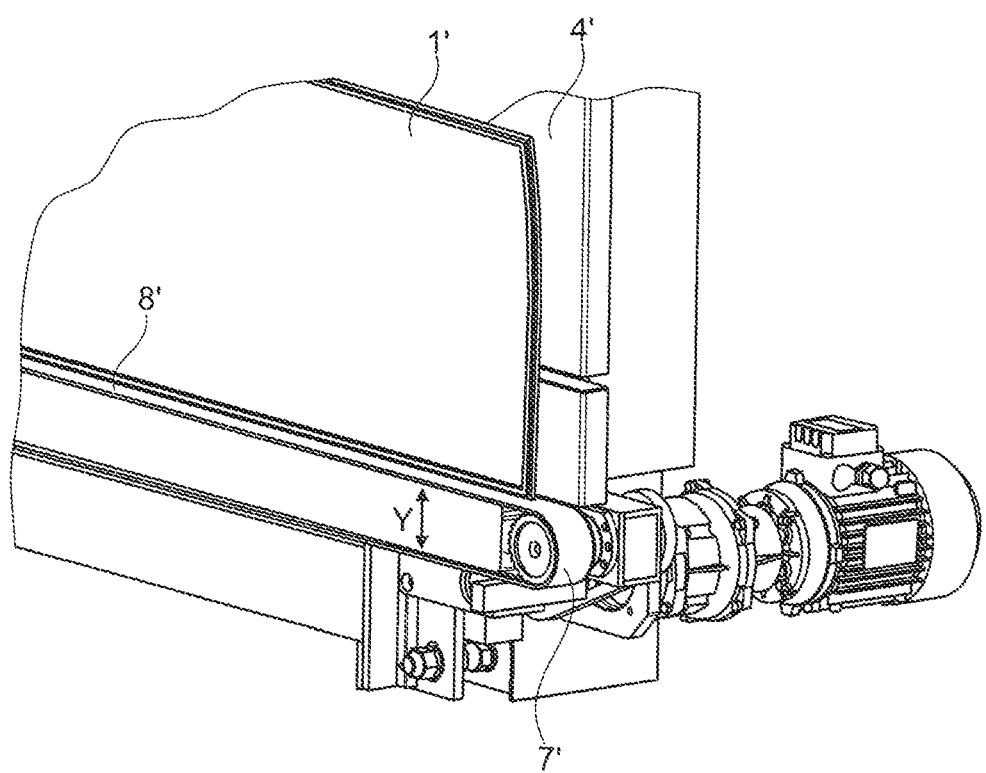
FIG. 2 an enlarged detail view of the region with the conveying device of FIG. 1.
Figure 3:
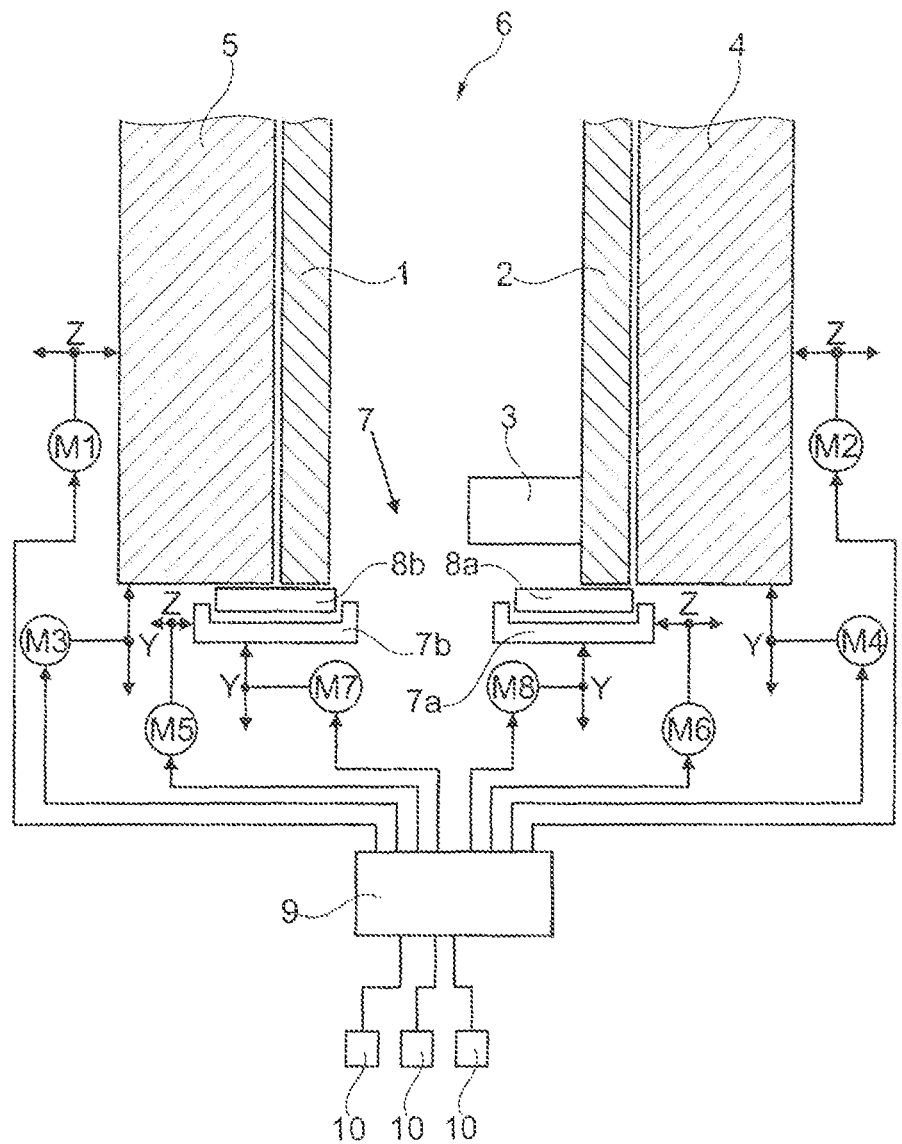
FIG. 3 a highly schematic representation of an assembly press of the invention, and FIG. 4 a sequence of operations to explain the production of a triple insulating glass element.

The inventive assembly press, which is shown as a highly schematic representation in FIG. 3 and which is intended for the production of insulating glass elements with at least two parallel panes 1, 2, which are connected together by a spacer 3, arranged between adjacent panes 1, 2, has two press elements 4, 5, which are arranged opposite each other and which define a working chamber 6 between each other, wherein the spacing between the press elements can be adjusted in a first direction along a first axis Z of the machine coordinate system, which has already been described with reference to the prior art and which has the orthogonal axes X, Y and Z, by drive devices M1, M2, in order to press together the panes 1, 2, located in the working chamber 6, to form the insulating glass element. In this case one of the two press elements 4, 5 may be basically stationary, as in the prior art described in the introduction, and only the second press element may be designed so as to be moveable relative to the stationary press element. In this case it is possible to dispense, for example, with the drive device M2. The detailed configuration of the drive device(s) of the press element or the two press elements can be achieved, for example, as in the case of the assembly press known from EP2093370A2. The movable press element(s) may be moved, in addition to the movement in the direction along or, more specifically, parallel to the Z axis in the vertical direction, along or, more specifically, parallel to the third axis Y, perpendicular thereto (by drive devices M3 and M4 respectively), wherein the ability to move at least one of the press elements in the direction of the Z axis and in the direction of the Y axis, in particular, together with the associated conveying element is important for the production of step elements. The drive device(s) M1, M2, M3, M4 of the press element(s) are connected to a central control device 9.

Although not shown, the press elements 4, 5 may be provided, as in the prior art, with vacuum devices, which open out at the contact surface with the glass panes and are designed to fix the respective glass pane by vacuum to the press surface of the press element. Since, however, the assembly press of the invention will be described for each glass pane (or for each half element, which is already assembled from a plurality of glass panes), i.e., for each of the two components, to be connected by pressing together, provides a dedicated conveying device, which supports the lower face of the respective component both during transport into the working chamber as well as during transport out of the working chamber, the holding force of such vacuum devices may be less than in the prior art.

Furthermore, the assembly press has a conveying device 7 for transporting the panes 1, 2, in order to form the insulating glass element, to a working position in the working chamber 6 and out of the working chamber in the second direction parallel to the X axis, which is perpendicular to the first direction Z (and to the plane of the sheet in the drawing of FIG. 3). The conveying device 7 has at least two conveying elements 7a, 7b, which can be driven separately from each other. Each of the conveying elements has a support mechanism 8a, 8b for supporting the lower face of at least one of the at least two panes 1, 2 during transport and while pressing together in a respective transport plane. In the drawing the support mechanism is an endless transport band or a transport belt or toothed belt 8a, 8b, which is laid around the spaced apart drive rolls in the direction of transport and of which only the upper band portion of the circumferential transport band is shown (the lower band portion is omitted). Instead of a long and continuous transport band it is also possible to provide several separate transport bands that are arranged successively in the direction of transport. As an alternative, the conveying elements can also be formed by an array of rolls or rollers or a combination of rolls, rollers and/or transport bands or transport belts.

An essential aspect of the invention is that the conveying elements 7a, 7b are adjustable, independently of each other, such that the transport planes, defined by the support mechanism (8a, 8b), are located at different positions in a third direction parallel to the Y axis, which is perpendicular to the first and the second direction. To this end, each of the conveying elements 7a, 7b has its own drive device M7, M8, which is connected to the central control device 9.

In addition, another drive device M5, M6 may also be provided for one or more or for each of the conveying elements 7a, 7b; and the drive device is also connected to the central control device 9 and allows the conveying element 7a, 7b to be adjusted, independently of other conveying elements and the press elements 4, 5, additionally in the first direction parallel to the Z axis.

The drive devices M7, M8, M5, M6 for effecting the displacement of the transport plane of the support mechanism 8a, 8b of the conveying elements 7a, 7b in the third direction parallel to the Y axis and/or for adjusting in the first direction parallel to the Z axis may be actuated by the control device 9 based on the evaluation of the output of one or more sensors 10, which scan the panes, in order to form the insulating glass element, and/or a data carrier, associated therewith, such as, for example, a barcode or a wirelessly readable digital storage element, at a position in the transport direction upstream of the working chamber 6 and which trigger the control commands, required for adjusting the position of the conveying elements 7a, 7b or, more specifically, the support mechanism 8a, 8b and the transport planes, defined by the latter, to the drive devices M1-M8 for the production of the respective insulating glass element.

The schematic representation in FIG. 3 does not show an optionally provided device for introducing a fill gas into the working chamber 6 and/or a device for evacuating the working chamber 6. This functional enhancement is well-known from the art, where such enhanced assembly presses are also referred to as "gas filling presses". The supply of the fill gas or the evacuation is carried out preferably by the space between two adjacent support mechanisms of the conveying elements of adjacent conveying elements of the conveying device, so that the space between the panes of the insulating glass element can be filled or can be evacuated, as long as the two glass panes are not yet pressed together or not yet fully pressed together. The filling operation of the working chamber with fill gas can take place, for example, simultaneously with the horizontal movement of the conveying element(s).

Figure 4:
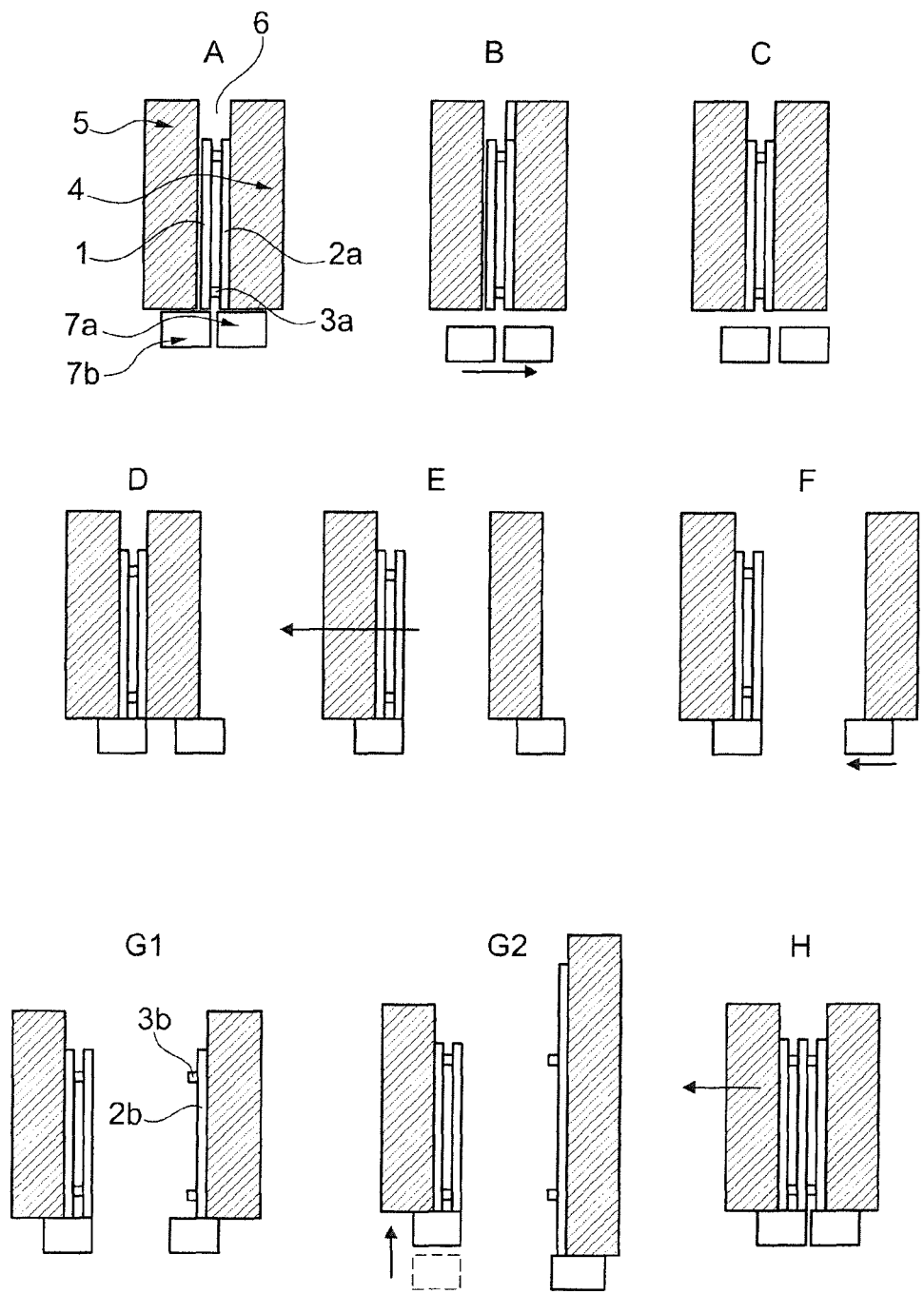

For illustrative purposes FIG. 4 shows a sequence of movements of the press elements and the conveying elements of the inventive assembly press for producing a triple insulating glass element with congruent glass panes or as a step element, in order to illustrate the possibility of moving the conveying elements in the Z and the Y direction for the purpose of repositioning under the glass panes independently of the movement of the press elements.

In step A the manufacturing process has already advanced so far that a half element composed of two glass panes 1, 2a is pressed together with a spacer 3a that is arranged in-between them. In this case the conveying elements 7a, 7b support in each case one of the glass panes 1, 2a as the final state of a preceding process for producing the half element with the assembly press of the invention. The half element corresponds to a conventional double insulating glass element with congruent glass panes and can, therefore, already represent a final product. The production takes place by first transporting a first glass pane 1 by the conveying element 7a into the working chamber, where it is held for a short period of time by pressing together the press elements 4, 5, in order to be able to lower the conveying element 7a in the Y direction and then to be able to move away in the Z direction, in order to move to its place the conveying element 7b under the lower face of the glass pane 1 (by moving in the Z direction and then in the Y direction independently of the press element 5). Then the glass pane 1, which is supported on the conveying element 7b, is moved together with the press element 5 (synchronously or coupled) in the Z direction, in order to open the working chamber. Then the second glass pane 2a, which bears the spacer, which has been mounted on the glass pane in an upstream station, is moved into the working chamber by the conveying element 7a, which has been moved in the meantime again to the position adjacent to the press element 4; and this second glass pane is pressed together with the first glass pane by mechanically coupling the press element 5 and the associated conveying element 7b with the glass pane 1, supported thereon, or by moving them synchronously in the Z direction. Then the state, shown in step A, is achieved.

If in this case the insulating glass element is finished, the press element 5 is moved, independently of the associated conveying element 7b, in the Z direction away from the stationary press element 4, in order to open the press, and then the finished insulating glass element is transported out of the working chamber by the two conveying elements 7a, 7b with the two glass panes 1, 2a being supported at same time.

In step B in the production of a triple insulating glass element, the glass panes are still held by the pressing force of the press elements. As a result, the conveying elements 7a, 7b can be moved in the Y direction without the risk of the glass panes being displaced with respect to as the final state of a preceding process for producing the half element with the assembly press of the invention. The half element corresponds to a conventional double insulating glass element with congruent glass panes and can, therefore, already represent a final product. The production takes place by first transporting a first glass pane 1 by the conveying element 7a into the working chamber, where it is held for a short period of time by pressing together the press elements 4, 5, in order to be able to lower the conveying element 7a in the Y direction and then to be able to move away in the Z direction, in order to move to its place the conveying element 7b under the lower face of the glass pane 1 (by moving in the Z direction and then in the Y direction independently of the press element 5). Then the glass pane 1, which is supported on the conveying element 7b, is moved together with the press element 5 (synchronously or coupled) in the Z direction, in order to open the working chamber. Then the second glass pane 2a, which bears the spacer, which has been mounted on the glass pane in an upstream station, is moved into the working chamber by the conveying element 7a, which has been moved in the meantime again to the position adjacent to the press element 4; and this second glass pane is pressed together with the first glass pane by mechanically coupling the press element 5 and the associated conveying element 7b with the glass pane 1, supported thereon, or by moving them synchronously in the Z direction. Then the state, shown in step A, is achieved.

If in this case the insulating glass element is finished, the press element 5 is moved, independently of the associated conveying element 7b, in the Z direction away from the stationary press element 4, in order to open the press, and then the finished insulating glass element is transported out of the working chamber by the two conveying elements 7a, 7b with the two glass panes 1, 2a being supported at same time.

In step B in the production of a triple insulating glass element, the glass panes are still held by the pressing force of the press elements. As a result, the conveying elements 7a, 7b can be moved in the Y direction without the risk of the glass panes being displaced with respect to each other and then can be moved away from the lower face of the glass panes. Subsequently in a step C the conveying elements 7a, 7b are moved in the Z direction; and the conveying element 7b is positioned under the two glass panes 1, 2a of the half element.

In step D the conveying element 7b is moved in the Y direction and lifted, until the lower face of the two glass panes 1, 2a is supported. In step E the press elements 4, 5 are opened by moving in this step the left press element 5 in the Z direction away from the stationary press element 4. This movement of the press element 5 in the Z direction takes place by mechanically coupling the associated conveying element 7b to the press element 5; and, therefore, the conveying element is moved together with the press element in the Z direction. As an alternative, a synchronous movement of the press element 5 and the conveying element 7b in the Z direction is possible. During this movement the half element is supported by the conveying element 7b.

In step F the conveying element 7a, which is associated with the other press element 4, in this case the stationary press element, is moved, independently of the press element 4 and the other conveying element 7b, in the Z direction toward the working chamber. Optionally a movement in the Y direction may be necessary before and/or after the movement in the Z direction.

In step G1 the third glass pane 2b is transported with the spacer 3b, mounted thereon beforehand, by the conveying element 7a into the working chamber 6 (in the direction of the X axis). Then in the final position the half element is moved by the coupled or synchronized movement of the press element 5 with the associated conveying element 7b in the Z direction to the stationary press element 4 with the associated conveying element 7a and is pressed together with the glass pane 2b, supported by the latter. Subsequently in a step H the press element 5 is moved without the associated conveying element 7b away from the stationary press element 4 in the Z direction, whereupon the finished insulating glass element can be transported out of the working chamber by the two conveying elements 7b, 7a with all of the glass panes 1, 2a, 2b being supported.

In so far as the triple insulating glass element is to be formed as a step element, in an alternative step G2 a third glass pane 2b having a suitable configuration is transported into the working chamber 6; and then simultaneously or subsequently the press element 5 is coupled or moved synchronously with the associated conveying element 7b and the half element, supported thereon, in the Y direction (lowered or preferably raised) and then is pressed together with the glass pane 2b by coupling the press element 5 or by moving synchronously with the associated conveying element 7b in the Z direction to the stationary press element 4. Subsequently in this case, too, in a step H the press element 5 is then moved without the associated conveying element 7b away from the stationary press element 4 in the Z direction, after which the finished step insulating glass element can be transported away from the working chamber by the two conveying elements 7b, 7a with all of the glass panes 1, 2a, 2b being supported.

The inventive feature of the coupled or synchronous movement of the press element 5 with the associated conveying element 7b in the Y direction (for example, in step G2) offers the advantage that it is possible to lower or, in particular, to lift both elements, in order to be able to produce different step elements. In the prior art, where only the conveying element can be moved in the Z direction, this movement is limited to a lowering, because the range of movement is blocked in the upward direction by the press element. Although a correspondingly narrow conveying element could perhaps be moved past the press element, it would no longer be possible to support the glass panes when closing the press elements, but rather after the transfer of the glass plane the conveying element would have to be moved out of the working chamber again and be lowered. In addition, increasing the distance between the press element and the conveying element by a relative lowering would lead to the problem that the press element no longer engages with the entire surface of the glass pane, because the glass pane at the lower face protrudes downwards beyond the press element. If the press element does not reach as far as the bottom edge of the glass pane, then an insufficient pressing force is exerted on the spacer in one area, so that there will be no tight edge seal in that area. In certain cases the glass pane can also break when pressed together, even if the conveying element is moved together with the press element in the Z direction. Finally an increase in the distance between the press element and the associated conveying element leads to problems when sealing the working chamber of the assembly press for filling with fill gas.

What is claimed is:

1. An assembly press for producing an insulating glass element with at least first and second parallel panes connected together by at least one spacer arranged between the first and second panes, the assembly press comprising:
    first and second press elements arranged opposite each other, a spacing between the first and second press elements defining a working chamber, the spacing being adjustable in a first direction (Z) to press together the first and second panes located in the working chamber to form the insulating glass element; and
    a conveying device to transport the first and second panes into the working chamber to a working position and out of the working chamber in a second direction (X), which is perpendicular to the first direction (Z), at least one of the first and second press elements being adjustable in a third direction (Y), which is perpendicular to the first direction (Z) and to the second direction (X), the conveying device comprising:
        a first drivable conveying element including a first support mechanism to support a lower face of the first pane during transport in a first transport plane; and
        a second drivable conveying element including a second support mechanism to support a lower face of the second pane during transport in a second transport plane, the first and second conveying elements being adjustable independently of each other such that the first and second transport planes defined by the first and second support mechanisms are located at different positions in the third direction (Y).

2. The assembly press of claim 1, wherein the first and second support mechanisms each comprise an array of rolls or rollers or a transport band or a transport belt or a combination thereof.

3. The assembly press of claim 1, wherein at least one of the first and second conveying elements is adjustable independently of each other and independently of the first and second press elements in the first direction (Z).

4. The assembly press of claim 1, wherein the first conveying element is couplable to the first press element, or the second conveying element is couplable to the second press element, or both the first and second conveying elements are respectively couplable to the first and second press elements, such that at least one of the first and second conveying elements is respectively adjustable together with the first or second press element in the first direction (Z), or in the third direction (Y), or in both the first direction (Z) and the third direction (Y).

5. The assembly press of claim 1, wherein: the first conveying element is drivable independently of, but synchronously with the first press element to be adjustable together in the first direction (Z), in the third direction (Y), or in both the first direction (Z) and the third direction (Y); and/or the second conveying element is drivable independently of, but synchronously with the second press element to be adjustable together in the first direction (Z), in the third direction (Y), or in both the first direction (Z) and the third direction (Y).

6. The assembly press of claim 1, wherein the first and second conveying elements are drivable synchronously with each other while the first and second transport planes are located at different positions in the third direction (Y).

7. The assembly press of claim 1, further comprising:
at least one sensor arranged at a position in the second direction (X) in front of the working chamber to scan the first and second panes or a data carrier configured as a barcode or a readable digital storage element associated with the first and second panes; and
drive devices to adjust the first and second transport planes of the first and second support mechanisms in the third direction (Y) and/or in the first direction (Z) based on the evaluation of the output of the at least one sensors.

8. The assembly press of claim 1, further comprising:
a device to introduce a fill gas into the working chamber; and
a device to evacuate the working chamber.

9. A method for producing insulating glass elements using the assembly press of claim 1, the insulating glass elements having at least first and second parallel panes connected together by at least one spacer arranged between the first and second panes, the method comprising:
transporting the first and second panes to the working position in the working chamber defined between the first and second press elements of the assembly press, wherein the spacing between the press elements is adjustable in the first direction (Z) and in the second direction (X) wherein lower faces of the first and second panes are respectively supported during transport by the first and second support mechanisms of the first and second conveying elements of the conveying device of the assembly press;
adjusting, relative to each other, the first and second transport planes respectively defined by the first and second support mechanisms, by adjusting at least one of the first and second support mechanisms in the third direction (Y) that is perpendicular to the first direction (Z) and the second direction (X);
adjusting the distance between the first and second press elements in the first direction (Z) to press together the first and second panes located in the working chamber in order to form the insulating glass element; and
transporting the insulating glass element out of the working chamber in the second direction (X), wherein the lower faces of the first and second panes are respectively supported by the first and second support mechanisms during transport.

10. The method of claim 9, wherein:
the first and second panes are transported sequentially to the working position in the working chamber; and
one of the first and second panes is transferred from one of the first and second support mechanisms to the other the first and second support mechanism such that both the first and second panes are supported by a same one of the first and second support mechanisms and are held temporarily by one of the first and second press elements, while the other of the support mechanisms is moved in the third direction (Y) and in the first direction (Z).

11. The method of claim 9, wherein one or both of the first and second conveying elements are coupled together with the respective first and second press elements or are adjusted, independently thereof, but synchronously in the first direction (Z) and/or in the third direction (Y).

12. The method of claim 9, wherein each of the first and second panes are always supported at their lower faces by one of the first and second support mechanisms and/or are held by a pressing force of one of the first and second press elements while transporting into the working chamber, while pressing the first and second panes to form the insulating glass element in the working chamber, and while transporting the insulating glass element out of the working chamber.

13. The method of claim 9, wherein before and/or during an adjustment of a distance between the first and second press elements in the first direction (Z), in order to press together the first and second panes, located in the working chamber, to form the insulating glass element, the working chamber is evacuated at least partially and then a fill gas is introduced into the working chamber.

* * * * *